US012643977B2

(12) United States Patent
Matsuoka et al.

(10) Patent No.: US 12,643,977 B2
(45) Date of Patent: Jun. 2, 2026

(54) CURABLE RESIN, CURABLE RESIN COMPOSITION, AND CURED PRODUCT

(71) Applicant: DIC Corporation, Tokyo (JP)

(72) Inventors: Ryuichi Matsuoka, Chiba (JP); Lichen Yang, Chiba (JP); Hiroyoshi Kannari, Chiba (JP)

(73) Assignee: DIC Corporation, Tokyo (JP)

( * ) Notice: Subject to any disclaimer, the term of this patent is extended or adjusted under 35 U.S.C. 154(b) by 654 days.

(21) Appl. No.: 18/008,944

(22) PCT Filed: May 13, 2021

(86) PCT No.: PCT/JP2021/018136

§ 371 (c)(1),
(2) Date: Dec. 7, 2022

(87) PCT Pub. No.: WO2021/251052

PCT Pub. Date: Dec. 16, 2021

(65) Prior Publication Data

US 2023/0272156 A1 Aug. 31, 2023

(30) Foreign Application Priority Data

Jun. 9, 2020 (JP) ................................ 2020-100427

(51) Int. Cl.

*C08G 61/02* (2006.01)
*C08G 61/10* (2006.01)
*C08L 65/02* (2006.01)
*C08L 65/04* (2006.01)

(52) U.S. Cl.

CPC ........... *C08G 61/025* (2013.01); *C08G 61/10* (2013.01); *C08L 65/02* (2013.01); *C08L 65/04* (2013.01); *C08G 2261/126* (2013.01); *C08G 2261/1646* (2013.01); *C08G 2261/312* (2013.01); *C08G 2261/592* (2013.01); *C08G 2261/76* (2013.01); *C08L 2201/08* (2013.01); *C08L 2203/162* (2013.01); *C08L 2203/206* (2013.01)

(58) Field of Classification Search

CPC .................. C08G 61/025; C08G 61/10; C08G 2261/126; C08G 2261/1646; C08G 2261/312; C08G 2261/592; C08G 2261/76; C08L 65/02; C08L 65/04; C08L 2201/08; C08L 2203/162; C08L 2203/206

See application file for complete search history.

(56) References Cited

U.S. PATENT DOCUMENTS

2009/0247032 A1* 10/2009 Mori ..................... C08L 71/126 428/457
2015/0274636 A1* 10/2015 Shin ......................... C08G 8/30 560/140
2019/0367678 A1 12/2019 Yi

FOREIGN PATENT DOCUMENTS

| | | |
|---|---|---|
| CN | 107057065 | 8/2017 |
| EP | 0260443 | 3/1988 |
| EP | 0344165 A | 12/1989 |
| EP | 0344165 B | 9/1991 |
| JP | S61145222 | 7/1986 |
| JP | S6368537 | 3/1988 |
| JP | S6465110 | 3/1989 |
| JP | H01503238 | 11/1989 |
| JP | H0543623 | 2/1993 |
| JP | H0931006 | 2/1997 |
| JP | 2005314556 | 11/2005 |
| JP | 2015189925 | 11/2015 |
| JP | 2017066268 | 4/2017 |

OTHER PUBLICATIONS

"International Search Report (Form PCT/ISA/210) of PCT/JP2021/018136," mailed on Jul. 27, 2021, with English translation thereof, pp. 1-5.

* cited by examiner

*Primary Examiner* — Shane Fang
(74) *Attorney, Agent, or Firm* — JCIPRNET

(57) ABSTRACT

An object is to provide a cured product having excellent heat resistance and dielectric properties (low dielectric properties) and prepregs, circuit boards, build-up films, semiconductor sealing materials, and semiconductor devices having these pieces of performance by using a curable resin having a specific structure. Specifically, provided is a curable resin having a structural unit (1) represented by General Formula (1) below and a terminal structure (2) represented by General Formula (2) below. In Formulae (1) and (2) above, the details of $R_1$, $R_2$, $R_3$, k, and X are as described herein.

(1)

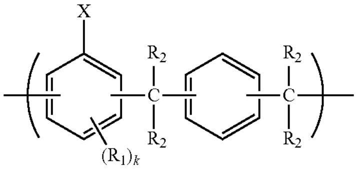

(2)

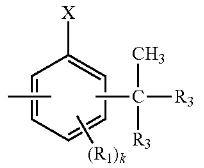

16 Claims, No Drawings

CURABLE RESIN, CURABLE RESIN COMPOSITION, AND CURED PRODUCT

CROSS-REFERENCE TO RELATED APPLICATION

This application is a 371 application of the International PCT application serial no. PCT/JP2021/018136, filed on May 13, 2021, which claims the priority benefit of Japan Patent Application No. 2020-100427, filed on Jun. 9, 2020. The entirety of each of the above-mentioned patent applications is hereby incorporated by reference herein and made a part of this specification.

TECHNICAL FIELD

The present invention relates to a curable resin having a specific structure, a curable resin composition containing the curable resin, and a cured product obtained by the curable resin composition.

BACKGROUND ART

Along with an increase in the volume of information communication in recent years, information communication in high frequency bands has become to be performed vigorously, and electric insulating materials having more excellent electrical properties, in particular, a low dielectric constant and a low dielectric loss tangent have been demanded in order to reduce transmission loss in high frequency bands.

Furthermore, printed boards or electronic components in which these electric insulating materials are used are exposed to high-temperature solder reflow during mounting, and thus materials having excellent heat resistance and indicating a high glass transition temperature are required. Recently in particular, lead-free solders, which have high melting points, have been used from the viewpoint of environmental issues, and thus requirements for electric insulating materials with higher heat resistance have been increasing.

In response to these requirements, curable resins containing vinyl groups having various chemical structures have been conventionally developed. As such curable resins, curable resins such as divinylbenzyl ether of bisphenol and poly(vinylbenzyl) ether of novolac have been proposed, for example (refer to PTL 1 and PTL 2, for example). However, these vinylbenzyl ethers cannot give cured products with sufficiently low dielectric properties, and the obtained cured products are problematic for stable use in high frequency bands. Furthermore, divinylbenzyl ether of bisphenol does not have sufficiently high heat resistance.

For the vinylbenzyl ethers with the above-described properties improved, several poly(vinylbenzyl) ethers with specific structures have been developed in order to improve dielectric properties and the like (refer to PTL 3 to PTL 5, for example). However, although attempts to reduce the dielectric loss tangent and attempts to improve heat resistance have been made, improvement in these properties is still not sufficient, and further improvement in properties is desired.

Thus, conventional curable resins containing vinyl groups including poly(vinylbenzyl) ether do not provide cured products having both a low dielectric loss tangent required for electric insulating materials, especially for electric insulating materials ready for high frequency, and heat resistance capable of withstanding lead-free soldering.

CITATION LIST

Patent Literature

PTL 1: Japanese Unexamined Patent Application Publication No. S63-68537

PTL 2: Japanese Unexamined Patent Application Publication No. S64-65110

PTL 3: Japanese Translation of PCT Application Publication No. H1-503238

PTL 4: Japanese Unexamined Patent Application Publication No. H9-31006

PTL 5: Japanese Unexamined Patent Application Publication No. 2005-314556

SUMMARY OF INVENTION

Technical Problem

Thus, an object of the present invention is to provide a cured product with excellent heat resistance (a high glass transition temperature) and low dielectric properties by using a curable resin having a specific structure.

Solution to Problem

Thus, in order to achieve the object, the inventors of the present invention have earnestly studied to find out that a curable resin that can contribute to heat resistance and low dielectric properties and a cured product obtained from a curable resin composition containing the curable resin has excellent heat resistance and low dielectric properties to complete the present invention.

Specifically, the present invention relates to a curable resin having a structural unit (1) represented by General Formula (1) below and a terminal structure (2) represented by General Formula (2) below:

[Chemical Formula 1]

(1)

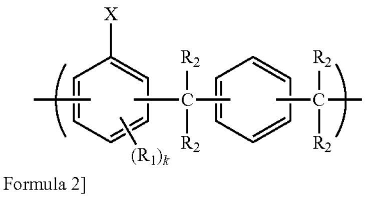

[Chemical Formula 2]

(2)

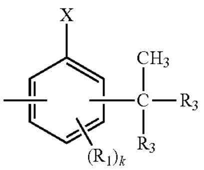

in General Formulae (1) and (2) above, $R_1$s each independently represent an alkyl group with a carbon number of 1 to 12, an aryl group, an aralkyl group, or a cycloalkyl group; k indicates an integer of 1 to 3; $R_2$s each independently represent a hydrogen atom or a methyl group; X represents a (meth)acryloyloxy group, a vinylbenzyl ether group, or an allyl ether group; and in General Formula (2) above, $R_2$s each independently represent an alkyl group with a carbon number of 1 to 12, an aryl group, an aralkyl group, a cycloalkyl group, or an alkenyl group.

In the curable resin of the present invention, General Formula (1) above is preferably represented by General Formula (1-1) below.

[Chemical Formula 3]

(1-1)

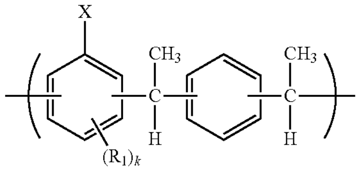

In the curable resin of the present invention, General Formula (2) above is preferably represented by General Formula (2-1) below.

[Chemical Formula 4]

(2-1)

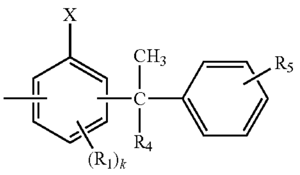

in General Formula (2-1) above, $R_4$ represents a hydrogen atom, a methyl group, or a phenyl group; and $R_5$ represents an alkyl group with a carbon number of 1 to 4.

In the curable resin according to the present invention, General Formula (1) above is preferably represented by General Formula (1-2) below, and General Formula (2) above is preferably represented by General Formula (2-2) or (2-3) below.

[Chemical Formula 5]

(1-2)

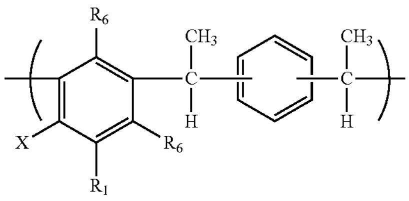

-continued

[Chemical Formula 6]

(2-2)

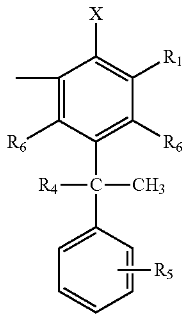

[Chemical Formula 7]

(2-3)

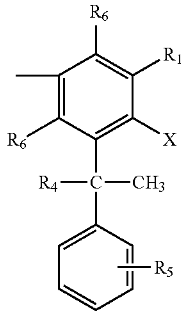

in General Formulae (1-2), (2-2), and (2-3) above, $R_6$s each independently represent a hydrogen atom, an alkyl group with a carbon number of 1 to 12, an aryl group, an aralkyl group, or a cycloalkyl group.

The curable resin of the present invention preferably has a weight average molecular weight of 500 to 50,000.

The present invention relates to a curable resin composition containing the curable resin.

The present invention relates to a cured product obtained by subjecting the curable resin composition to a curing reaction.

Advantageous Effects of Invention

The curable resin of the present invention can contribute to heat resistance and low dielectric properties, and thus a cured product obtained from a curable resin composition containing the curable resin has excellent heat resistance and low dielectric properties (especially, a low dielectric loss tangent) and is thus useful.

DESCRIPTION OF EMBODIMENTS

The following describes the present invention in detail.

<Curable Resin>

The present invention relates to a curable resin having a structural unit (1) represented by General Formula (1) below and a terminal structure (2) represented by General Formula (2) below:

[Chemical Formula 8]

(1)

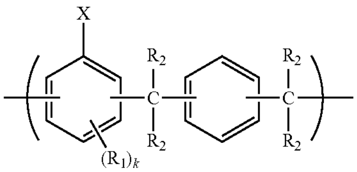

[Chemical Formula 9]

(2)

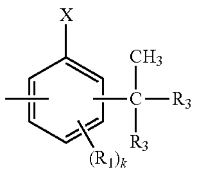

in General Formulae (1) and (2) above, $R_1$s each independently represent an alkyl group with a carbon number of 1 to 12, an aryl group, an aralkyl group, or a cycloalkyl group; k indicates an integer of 1 to 3; $R_2$s each independently represent a hydrogen atom or a methyl group; X represents a (meth)acryloyloxy group, a vinylbenzyl ether group, or an allyl ether group; and in General Formula (2) above, $R_3$s each independently represent an alkyl group with a carbon number of 1 to 12, an aryl group, an aralkyl group, a cycloalkyl group, or an alkenyl group.

The curable resin has the terminal structure and the main chain structure having the specific structures, thereby reducing the proportion of polar functional groups in the structure of the curable resin and providing a cured product produced using the curable resin with excellent low dielectric properties, which is preferred. In addition, the curable resin having a cross-linking group provides a cured product to be obtained with excellent heat resistance, which is preferred.

In General Formula (1) above, $R_1$s each independently represent an alkyl group with a carbon number of 1 to 12, an aryl group, an aralkyl group, or a cycloalkyl group and is preferably an alkyl group with a carbon number of 1 to 6, an aryl group, or a cycloalkyl group. $R_1$ being an alkyl group with a carbon number of 1 to 12 or the like reduces the planarity in the vicinity of the benzene ring in General Formula (1) above, and reduced crystallinity improves solvent solubility and lowers the melting point, which is a preferred mode.

In General Formula (1) above, k indicates an integer of 1 to 3 and is preferably an integer of 1 or 2. By k being within the above range, the planarity in the vicinity of the benzene ring in General Formula (1) above reduces, and reduced crystallinity improves solvent solubility and lowers the melting point, which is a preferred mode.

In General Formula (1) above, $R_2$ are each independently a hydrogen atom or a methyl group. $R_2$ being a hydrogen atom or the like reduces the dielectric constant, which is a preferred mode.

In General Formula (1) above, X is a (meth)acryloyloxy group, a vinylbenzyl ether group, or an allyl ether group, preferably a (meth)acryloyloxy group, and more preferably a methacryloyloxy group. The curable resin having the cross-linking group provides a cured product having a low dielectric loss tangent, which is a preferred mode. The methacryloyloxy group contains a methyl group in the structure of the curable resin compared to other cross-linking groups (ether groups as polar groups such as a vinylbenzyl group and an allyl ether group, for example), and thus steric hindrance increases, and it is presumed that molecular mobility further reduces, resulting in a cured product with a much lower dielectric loss tangent, which is preferred. When there are a plurality of cross-linking groups, the cross-linking density increases, and heat resistance improves.

X as the cross-linking group is also a polar group, but $R_1$ as the substituent is adjacent thereto, thereby making it steric hindrance, inhibiting the molecular mobility of X, and lowering the dielectric loss tangent of the cured product to be obtained, which is a preferred mode.

In General Formula (2) above, $R_3$s each independently represent an alkyl group with a carbon number of 1 to 12, an aryl group, an aralkyl group, a cycloalkyl group, or an alkenyl group and is preferably an alkyl group with a carbon number of 1 to 10, an aryl group, or a cycloalkyl group. $R_3$ being an alkyl group with a carbon number of 1 to 12 or the like reduces the planarity in the vicinity of the benzene ring in General Formula (2) above, and reduced crystallinity improves solvent solubility and lowers the melting point, which is a preferred mode. X as the cross-linking group is also a polar group, but $R_3$ as the substituent is adjacent thereto, thereby making it steric hindrance, inhibiting the molecular mobility of X, and lowering the dielectric loss tangent of the cured product to be obtained, which is a preferred mode.

The curable resin of the present invention contains General Formulae (1) and (2) above and preferably has a structure repeating the structural unit (1) and has a terminal structure based on General Formula (2) above, but may contain, as structures (or structural units) other than the structural unit (1) and the terminal structure (2), structures (or structural units) such as a phenylethylidene skeleton (structure), an indane skeleton (structure), a dicyclopentadiene skeleton (structure), and an aralkyl group (structure) having substituents. In other words, the structural unit (1) may form a block structure or form a random structure together with other structural units so long as it does not affect the properties of the present invention. The phenylethylidene skeleton (structure) and the like other than the structural unit (1) and the terminal structure (2) have low polarity and are not structures that increase the dielectric constant or the dielectric loss tangent, thus not particularly affecting the properties of the curable resin in the present invention.

In the curable resin of the present invention, General Formula (1) above is preferably represented by General Formula (1-1) below.

[Chemical Formula 10]

(1-1)

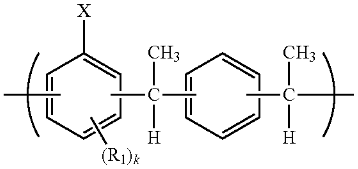

In the curable resin of the present invention, General Formula (2) above is preferably represented by General Formula (2-1) below.

[Chemical Formula 11]

(2-1)

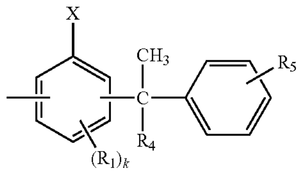

In General Formula (2-1) above, $R_4$ is preferably represented by a hydrogen atom, a methyl group, or a phenyl group and is more preferably a hydrogen atom or a methyl group, whereas $R_5$ is preferably represented by an alkyl group with a carbon number of 1 to 4 and is more preferably an alkyl group with a carbon number of 1 or 2. $R_4$ being the hydrogen atom or the like lowers the dielectric loss tangent, which is a preferred mode, whereas $R_5$ being the alkyl group or the like lowers the dielectric loss tangent, which is a preferred mode.

In the curable resin of the present invention, General Formula (1) above is preferably represented by General Formula (1-2) below, whereas General Formula (2) above is preferably represented by General Formula (2-2) or (2-3) below.

[Chemical Formula 12]

(1-2)

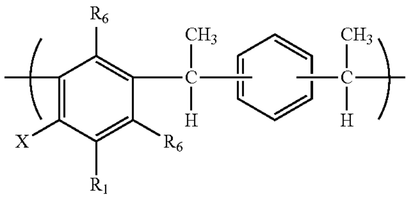

[Chemical Formula 13]

(2-2)

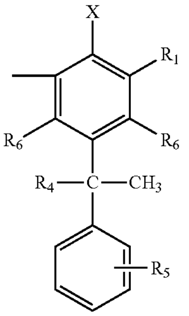

[Chemical Formula 14]

(2-3)

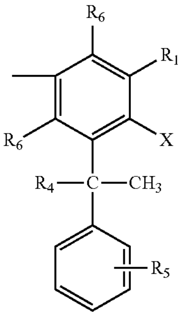

In General Formulae (1-2), (2-2), and (2-3) above, $R_6$ are each independently preferably represented by a hydrogen atom, an alkyl group with a carbon number of 1 to 12, an aryl group, an aralkyl group, or a cycloalkyl group and are more preferably represented by a hydrogen atom, an alkyl group, an aryl group, or a cycloalkyl group with a carbon number of 1 to 6. $R_6$ being the hydrogen atom or the like lowers the dielectric loss tangent, which is a preferred mode.

In General Formulae (1) to (2-3), the same symbols, the same substituents, and the same functional groups (k, X, $R_1$, and the like) are assumed to be common. The same applies to General Formulae (3-1) to (7) below, which are described below.

<Method for Producing Intermediate Phenolic Compound>

As a method for producing the curable resin, the following first describes a method for producing an intermediate phenolic compound, which is a raw material (a precursor) for the curable resin.

As the method for producing the intermediate phenolic compound, a reaction product (c) obtained by mixing together an aralkyl compound indicated by General Formula (3-1) or (3-2) below (hereinafter, may be referred to as a "compound (a)") and a phenol indicated by General Formula (4) below or a derivative thereof (hereinafter, may be referred to as a "compound (b)") to be reacted together in the presence of an acid catalyst is reacted with an aralkyl compound indicated by General Formula (5-1) or (5-2) below (hereinafter, may be referred to as a "compound (d)"), and thereby the intermediate phenolic compound having a structural unit (6) represented by a general formula below and a terminal structure represented by General Formula (7) below can be obtained.

As the method for producing the intermediate phenolic compound, the compound (b) and the compound (d) can also be charged simultaneously to synthesize the intermediate phenolic compound in a one-pot process.

Y in General Formula (3-1) above is preferably a halogen atom, a hydroxy group, or an oxyalkyl group and more preferably a hydroxy group.

[Chemical Formula 15]

(3-1)

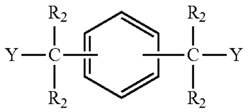

[Chemical Formula 16]

(3-2)

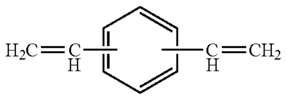

[Chemical Formula 17]

(4)

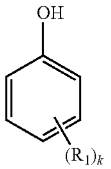

-continued

[Chemical Formula 18]

(5-1)

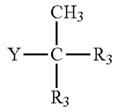

[Chemical Formula 19]

(5-2)

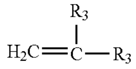

[Chemical Formula 20]

(6)

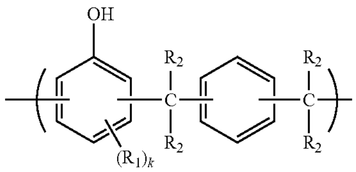

[Chemical Formula 21]

(7)

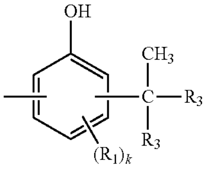

Specific examples of the compound (a) include 1,2-di(chloromethyl)benzene, 1,2-di(bromomethyl)benzene, 1,3-di(chloromethyl)benzene, 1,3-di(fluoromethyl)benzene, 1,4-di(chloromethyl)benzene, 1,4-di(bromomethyl)benzene, 1,4-di(fluoromethyl)benzene, 1,4-di(chloromethyl)-2,5-dimethylbenzene, 1,3-di(chloromethyl)-4,6-dimethylbenzene, 1,3-di(chloromethyl)-2,4-dimethylbenzene, 4,4'-bis(chloromethyl)biphenyl, 2,2'-bis(chloromethyl)biphenyl, 2,4'-bis(chloromethyl)biphenyl, 2,3'-bis(chloromethyl)biphenyl, 4,4'-bis(bromomethyl)biphenyl, 4,4'-bis(chloromethyl)diphenyl ether, 2,7-di(chloromethyl)naphthalene, p-xylylene glycol, m-xylene glycol, 1,4-di(2-hydroxy-2-ethyl)benzene, 4,4'-bis(dimethylol)biphenyl, 2,4'-bis(dimethylol)biphenyl, 4,4'-bis(2-hydroxy-2-propyl)biphenyl, 2,4'-bis(2-hydroxy-2-propyl)biphenyl, 1,4'-di(methoxymethyl)benzene, 1,4'-di(ethoxymethyl)benzene, 1,4'-di(isopropoxy)benzene, 1,4'-di(butoxy)benzene, 1,3'-di(methoxymethyl)benzene, 1,3'-di(ethoxymethyl)benzene, 1,3'-di(isopropoxy)benzene, 1,3'-di(butoxy)benzene, 1,4-di(2-methoxy-2-ethyl)benzene, 1,4-di(2-hydroxy-2-ethyl)benzene, 1,4-di(2-ethoxy-2-ethyl)benzene, 4,4'-bis(methoxymethyl)biphenyl, 2,4'-bis(methoxymethyl)biphenyl, 2,2'-bis(methoxymethyl)biphenyl, 2,3'-bis(methoxymethyl)biphenyl, 3,3'-bis(methoxymethyl)biphenyl, 3,4'-bis(methoxymethyl)biphenyl, 4,4'-bis(ethoxymethyl)biphenyl, 2,4'-bis(ethoxymethyl)biphenyl, 4,4'-bis(isopropoxy)methylbiphenyl, 2,4'-bis(isopropoxy)methylbiphenyl, bis(1-methoxy-1-ethyl)biphenyl, bis(1-methoxy-1-ethyl)biphenyl, bis(1-isopropoxy-1-ethyl)biphenyl, bis(2-hydroxy-2-propyl)biphenyl, bis(2-methoxy-2-propyl)biphenyl, bis(2-isopropoxy-2-propyl)biphenyl, 1,3-bis(α-hydroxyisopropyl)benzene, 1,4-bis(α-hydroxyisopropyl)benzene, p-divinylbenzene, m-divinylbenzene, 4,4'-bis(vinyl)biphenyl, 1,3-bis(1-hydroxyethyl)benzene, and 1,4-bis(1-hydroxyethyl)benzene. These compounds (a) may each be used alone, or two or more may be used in combination. Among them, as the compound (a), a more preferred mode is the use of p-xylylene glycol, m-xylene glycol, 1,3-bis(α-hydroxyisopropyl)benzene, 1,4-bis(α-hydroxyisopropyl)benzene, p-divinylbenzene, or m-divinylbenzene, for example, from the viewpoint of industrial availability.

The compound (b) is not limited to a particular compound. Specific examples thereof include cresols such as o-cresol, m-cresol, and p-cresol; xylenols such as 2,3-xylenol, 2,4-xylenol, 2,5-xylenol, 2,6-xylenol (2,6-dimethylphenol), 3,4-xylenol, 3,5-xylenol, and 3,6-xylenol; 2,3,5-trimethylphenol and 2,3,6-trimethylphenol; ethylphenols such as o-ethylphenol (2-ethylphenol), m-ethylphenol, and p-ethylphenol; isopropylphenols; butylphenols such as butylphenol and p-t-butylphenol; alkylphenols such as p-pentylphenol, p-octylphenol, p-nonylphenol, and p-cumylphenol; and monosubstituted phenols such as o-phenylphenol (2-phenylphenol), p-phenylphenol, 2-cyclohexylphenol, and 2-benzylphenol. These compounds (b) may each be used alone, or two or more may be used in combination. Among them, as the compound (b), the use of cresol or xylenol is a more preferred mode, for example, from the viewpoint of industrial availability. However, if the steric hindrance is too large, there is a concern that it may hinder reactivity during synthesis of the intermediate phenolic compound, and thus it is preferable to use the compound (b) having a methyl group, an ethyl group, a cyclohexyl group, or a phenyl group, for example.

In the method for producing the intermediate phenolic compound, the compound (a) and the compound (b) are prepared at a molar ratio of the compound (b) with respect to the compound (a) (the compound (b)/the compound (a)) of preferably 2.5/1 to 1.05/1 and more preferably 2/1 to 1.1/1 and are reacted in the presence of an acid catalyst, and thereby the reaction product (c) of the compound (a) and the compound (b) can be obtained.

Examples of the acid catalyst for use in the reaction include inorganic acids such as phosphoric acid, hydrochloric acid, and sulfuric acid; organic acids such as oxalic acid, benzene sulfonic acid, toluene sulfonic acid, methanesulfonic acid, and fluoromethanesulfonic acid; solid acids such as activated white clay, acidic white clay, silica alumina, zeolite, and strongly acidic ion exchange resins; and heteropoly acid. Preferably used are oxalic acid, benzenesulfonic acid, toluene sulfonic acid, methanesulfonic acid, and fluoromethanesulfonic acid, which are homogeneous catalysts that can be easily removed after the reaction by neutralization with a base and washing with water.

As to the blending amount of the acid catalyst, it is blended in a range of 0.001 to 40 parts by mass with respect to 100 parts by mass of the total amount of the compound (a) and the compound (b) as the raw materials to be prepared first. From the viewpoints of handleability and economy, the amount is preferably 0.001 to 25 parts by mass.

The reaction temperature may be normally in a range of 80 to 200° C. and is preferably 100 to 150° C. in order to inhibit the formation of isomeric structures, avoid side reactions such as thermal decomposition, and obtain a highly pure intermediate phenolic compound.

The reaction time is usually in a range of a total of 0.5 to 24 hours and preferably in a range of a total of 0.5 to 15 hours under the reaction temperature condition because the reaction does not proceed completely in a short time, whereas side reactions such as a thermal decomposition reaction of the product occur in a long time.

Specific examples of the compound (d) (functioning as a terminal sealant) are not limited to particular compounds. Specific examples thereof include styrene or styrene derivatives such as styrene, styrene dimer, α-methylstyrene, α-methylstyrene dimer, methylstyrene, vinyltoluene, ethylstyrene, and t-butylstyrene; vinylnaphthalene, vinylbiphenyl, diphenylethylene, and 1-octene.

As to the blending amount of the compound (d), it is blended in a range of 1 to 200 parts by mass with respect to 100 parts by mass of the total amount of the compound (a) and the compound (b) as the raw materials to be prepared first. From the viewpoint of reactivity, the amount is preferably 10 to 100 parts by mass.

The reaction temperature for the compound (b) and the reaction product (c) may be normally in a range of 80 to 200° C. and is preferably 100 to 150° C. in order to inhibit the formation of isomeric structures, avoid side reactions such as thermal decomposition, and obtain a highly pure intermediate phenolic compound.

The reaction time is usually in a range of a total of 0.5 to 24 hours and preferably in a range of a total of 0.5 to 15 hours under the reaction temperature condition because the reaction does not proceed completely in a short time, whereas side reactions such as a thermal decomposition reaction of the product occur in a long time.

For the reaction of the reaction product (c) and the compound (d), the acid catalyst used in the reaction of the compound (a) and the compound (b) described above can be used in the same manner.

In the method for producing the intermediate phenolic compound, although other solvents are not necessarily required to be used because any of the raw materials may also serve as a solvent, solvents can be used. For a solvent generated during the reaction (methanol, for example), a method that distills off it and then performs the reaction in the above reaction temperature range may be employed.

Examples of an organic solvent used for synthesizing the intermediate phenolic compound include ketones such as acetone, methyl ethyl ketone (MEK), methyl isobutyl ketone, cyclohexanone, and acetophenone; alcohols such as 2-ethoxyethanol and methanol; aprotic solvents such as N,N-dimethylformamide, N,N-dimethylacetamide, dimethyl sulfoxide, N-methyl-2-pyrrolidone, acetonitrile, and sulfolane; cyclic ethers such as dioxane and tetrahydrofuran; esters such as ethyl acetate and butyl acetate; aromatic solvents such as benzene, toluene, and xylene. These may be used alone or used by being mixed together.

The hydroxy group equivalent (the phenol equivalent) of the intermediate phenolic compound is preferably 100 to 1,000 g/eq and more preferably 200 to 500 g/eq from the viewpoint of heat resistance. The hydroxy group equivalent (the phenol equivalent) of the intermediate phenolic compound is calculated by the titration method, which refers to the neutralization titration method conforming to JIS K0070.

<Method for Producing Curable Resin>

The following describes a method for producing the curable resin (introduction of a (meth)acryloyloxy group, a vinylbenzyl ether group, or an allyl ether group to the intermediate phenolic compound).

The curable resin can be obtained by a known method such as the reaction of the intermediate phenolic compound with (meth)acrylic anhydride, (meth)acrylic acid chloride, chloromethyl styrene, chlorostyrene, allyl chloride, allyl bromide, or the like (hereinafter, may be referred to as a compound (e)) in the presence of a basic or acidic catalyst. By reacting together these compounds, a cross-linking group (X) can be introduced to the intermediate phenolic compound, which also becomes thermosetting with a low dielectric constant and a low dielectric loss tangent, which is a preferred mode.

As the compound (e) (functioning as a cross-linking group introducing agent), examples of the (meth)acrylic anhydride include acrylic anhydride and methacrylic anhydride. Examples of the (meth)acrylic acid chloride include methacrylic acid chloride and acrylic acid chloride. Examples of chloromethylstyrene include p-chloromethylstyrene and m-chloromethylstyrene, examples of chlorostyrene include p-chlorostyrene and m-chlorostyrene, examples of allyl chloride include 3-chloro-1-propene, and examples of allyl bromide include 3-bromo-1-propene. These may each be used alone or used by being mixed together. Among them, methacrylic anhydride or methacrylic acid chloride, which can produce a cured product with a much lower dielectric loss tangent, is preferably used.

Specific examples of the basic catalyst include dimethylaminopyridine, alkaline earth metal hydroxides, alkali metal carbonates, and alkali metal hydroxides. Specific examples of the acidic catalyst include sulfuric acid and methanesulfonic acid. Dimethylaminopyridine is particularly superior in terms of catalytic activity.

Examples of the reaction of the intermediate phenolic compound and the compound (e) include a method of adding 1 to 10 moles of the compound (e) per 1 mole of hydroxy groups contained in the intermediate phenolic compound and reacting them at a temperature of 30 to 150° C. for 1 to 40 hours while 0.01 to 0.2 mole of the basic catalyst is added at once or added gradually.

The reaction rate in the synthesis of the curable resin can be increased by using an organic solvent in combination during the reaction with the compound (e) (introduction of the cross-linking group). Such an organic solvent is not limited to a particular organic solvent. Examples thereof include ketones such as acetone and methyl ethyl ketone; alcohols such as methanol, ethanol, 1-propyl alcohol, isopropyl alcohol, 1-butanol, secondary butanol, and tertiary butanol, cellosolves such as methyl cellosolve and ethyl cellosolve; ethers such as tetrahydrofuran, 1,4-dioxane, 1,3-dioxane, and diethoxyethane; aprotic polar solvents such as acetonitrile, dimethyl sulfoxide, and dimethylformamide; and toluene. These organic solvents may each be used alone, or two or more may be used in combination as appropriate in order to adjust polarity.

After the end of the reaction with the compound (e) described above (introduction of the cross-linking group), the reaction product is reprecipitated in a poor solvent, then the precipitate is stirred in the poor solvent at a temperature of 20 to 100° C. for 0.1 to 5 hours and is filtered under reduced pressure, then the precipitate is dried at a temperature of 40 to 80° C. for 1 to 10 hours, and thereby the desired curable resin can be obtained. Examples of the poor solvent include hexane.

The curable resin of the present invention contains General Formulae (1) and (2) above and preferably has a structure repeating the structural unit (1) and has a terminal structure based on General Formula (2) above, but even if it contains structures other than the structural unit (1) and the terminal structure (2) as a side reaction by the method of production, there is no particular problem if they do not affect the properties of the curable resin in the present invention.

The curable resin of the present invention has a weight average molecular weight (Mw) of preferably 500 to 50,000, more preferably 500 to 20,000, and even more preferably 800 to 10,000. When the weight average molecular weight of the curable resin is within the above range, excellent workability and moldability are achieved, which is preferred.

The softening point of the curable resin is preferably 150° C. or lower and more preferably 50 to 100° C. When the softening point of the curable resin is within the above range, excellent processability is achieved, which is preferred.

<Curable Resin Composition>

The curable resin composition of the present invention preferably contains the curable resin. The curable resin has the substituent $R_1$ in the structure and has —$C(CH_3)R_3R_3$ in the terminal structure, thereby inhibiting the molecular mobility of the cross-linking group and having an excellent low dielectric loss tangent, and has —$CR_2R_2$-$C_6H_4$—$CR_2R_2$— in the structural unit, thereby reducing a free volume, having an excellent low dielectric constant, exhibiting flexibility, having excellent solvent solubility, making the preparation of the curable resin composition easy, having excellent handleability, and reducing the proportion of polar functional groups in the structure of the curable resin, and thus a cured product obtained using the curable resin composition has excellent low dielectric properties, which is a preferred mode.

[Other Resins and Others]

For the curable resin composition of the present invention, in addition to the curable resin, other resins, curing agents, curing accelerators, or the like can be used without particular limitations to the extent that they do not impair the purpose of the invention. As described below, although the curable resin can produce a cured product by heating or the like without blending any curing agent, when blended with other resins and the like in combination, for example, a curing agent, a curing accelerator, or the like can be blended and used.

The curable resin composition of the present invention contains the curable resin, in which when X is an allyl ether group in the curable resin, unlike a (meth)acryloyloxy group and a vinylbenzyl ether group, X cannot be homopolymerized (cross-linked) (it alone cannot produce a cured product), and thus when X is an allyl ether group, it is necessary to use a curing agent, a curing accelerator, or the like.

[Other Resins]

As the other resins, alkenyl group-containing compounds such as bismaleimides, allyl ether-based compounds, allylamine-based compounds, triallyl cyanurate, alkenylphenol-based compounds, and vinyl group-containing polyolefin compounds can be added, for example. Other thermosetting resins such as thermosetting polyimide resins, epoxy resins, phenolic resins, active ester resins, benzoxazine resins, and cyanate resins can also be blended as appropriate in accordance with the purpose.

[Curing Agent]

Examples of the curing agents include amine-based compounds, amide-based compounds, acid anhydride-based compounds, phenolic compounds, and cyanate ester compounds. These curing agents may be used alone, or two or more may be used in combination.

[Curing Accelerator]

Various types of curing accelerators can be used. Examples thereof include phosphorus-based compounds, tertiary amines, imidazoles, organic acid metal salts, Lewis acids, and amine complex salts. When used for semiconductor sealing materials in particular, phosphorus-based compounds such as triphenylphosphine or imidazoles are preferred due to their excellent curability, heat resistance, electric properties, moisture resistance reliability, and the like. These curing accelerators can be used alone, or two or more can be used in combination.

[Fire Retardant]

The curable resin composition of the present invention can be blended with fire retardants in order to exhibit fire retardancy as needed, and among them, non-halogenated fire retardants containing substantially no halogen atoms are preferably blended. Examples of the non-halogenated fire retardants include phosphorus-based fire retardants, nitrogen-based fire retardants, silicone-based fire retardants, inorganic fire retardants, and organometallic salt-based fire retardants, and these fire retardants may be used alone, or two or more may be used in combination.

[Filler]

The curable resin composition of the present invention can be blended with inorganic fillers as needed. Examples of the inorganic fillers include fused silica, crystalline silica, alumina, silicon nitride, and aluminum hydroxide. When the blending amount of the inorganic fillers is made especially large, fused silica is preferably used. For the fused silica, although both crushed one and spherical one can be used, it is preferable to use mainly the spherical one in order to increase the blending amount of the fused silica and to inhibit an increase in the melt viscosity of the molding material. To further increase the blending amount of the spherical silica, the particle size distribution of the spherical silica is preferably appropriately adjusted. When the curable resin composition is used for uses such as conductive pastes described below in detail, conductive fillers such as silver powder and copper powder can be used.

[Other Compounding Agents]

Various compounding agents such as silane coupling agents, mold release agents, pigments, and emulsifiers can be added to the curable resin composition of the present invention as needed.

<Cured Product>

The cured product of the present invention is preferably obtained by subjecting the curable resin composition to a curing reaction. The curable resin composition is obtained by the curable resin alone or uniformly mixing together the components such as the curing agents described above in addition to the curable resin and can be easily made into a cured product by the same method as conventionally known methods. Examples of the cured product include molded cured products such as laminates, cast products, adhesive layers, coatings, and films.

Examples of the curing reaction include heat curing and ultraviolet curing reactions. Among them, the heat curing reaction is easily carried out even under no catalyst, but when the reaction is desired to be conducted more quickly, the addition of polymerization initiators such as organic peroxides and azo compounds, or basic catalysts such as phosphine-based compounds and tertiary amines is effective. Examples thereof include benzoyl peroxide, dicumyl peroxide, azobisisobutyronitrile, triphenylphosphine, triethylamine, and imidazoles.

<Uses>

The cured product obtained by the curable resin composition of the present invention has excellent heat resistance and low dielectric properties and can thus suitably be used for heat-resistant members and electronic members. It can be particularly suitably used for prepregs, circuit boards, semiconductor sealing materials, semiconductor devices, build-up films, build-up boards, adhesives, and resist materials. It can also be suitably used for matrix resins of fiber-reinforced resins and is particularly suitable as prepregs with high heat resistance. In addition, the curable resin contained in the curable resin composition exhibits excellent solubility to various solvents and can thus be made into paints. The thus obtained heat-resistant members and electronic members can be suitably used for various uses including, but not limited to, industrial machine parts, general machine parts, parts for automobiles, railways, vehicles, and the like, space and aviation-related parts, electronic and electric parts, construction materials, container and packaging members, household goods, sports and leisure goods, and housing members for wind power generation.

EXAMPLES

The following describes the present invention specifically by means of examples and comparative examples, in which "part(s)" and "%" are on a mass basis unless otherwise specified. Curable resins and cured products obtained using the curable resins were synthesized under the following conditions, and furthermore, the obtained cured products were measured and evaluated under the following conditions.

<GPC Measurement (Evaluation of Weight Average Molecular Weight (Mw) of Curable Resin)

Measurement was conducted using the following measurement apparatus and measurement conditions to obtain GPC charts of the curable resins obtained by the method of synthesis indicated below. The weight average molecular weights (Mw) of the curable resins were calculated from the results of the GPC charts.

Measurement apparatus: "HLC-8320 GPC" manufactured by Tosoh Corporation

Column: Guard column "HXL-L" manufactured by Tosoh Corporation+"TSK-GEL G2000HXL" manufactured by Tosoh Corporation+"TSK-GEL G2000HXL" manufactured by Tosoh Corporation "TSK-GEL G3000HXL" manufactured by Tosoh Corporation+ "TSK-GEL G4000HXL" manufactured by Tosoh Corporation Detector: RI (differential refractometer)

Data processing: "GPC Workstation EcoSEC-WorkStation" manufactured by Tosoh Corporation Measurement conditions: Column temperature 40° C.

Developing solvent tetrahydrofuran

Flow rate 1.0 ml/minute

Standard: The following monodispersed polystyrenes of known molecular weights were used in conformity with the measurement manual of the "GPC Workstation EcoSEC-WorkStation."

(Polystyrenes Used)

"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation Sample: A microfiltered tetrahydrofuran solution (50 μl) of 1.0% by mass in terms of solid content of the curable resin obtained in the synthesis example.

Example 1

Into a 3 L, four-necked separable flask equipped with a stirrer, a cooling tube, a nitrogen introducing tube, and a thermometer, 324.4 g of o-cresol, 276.3 g of p-xylylene glycol, and 19.0 g of p-toluenesulfonic acid monohydrate were charged, the temperature of the mixture was raised to 150° C. while being stirred, and it was reacted for 5 hours. During this process, methanol produced by the reaction was excluded to the outside of the system. The temperature was then lowered to 120° C., and 260.4 g of styrene was added dropwise thereto over 5 hours to be reacted to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,100).

Example 2

Into a 3 L, four-necked separable flask equipped with a stirrer, a cooling tube, a nitrogen introducing tube, and a thermometer, 324.4 g of o-cresol, 388.5 g of 1,3-bis(α-hydroxyisopropyl)benzene, and 19.0 g of p-toluenesulfonic acid monohydrate were charged, the temperature of the mixture was raised to 150° C. while being stirred, and it was reacted for 5 hours. During this process, water produced by the reaction was excluded to the outside of the system. The temperature was then lowered to 120° C., and 260.4 g of styrene was added dropwise thereto over 5 hours to be reacted to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,200).

Example 3

Into a 3 L, four-necked separable flask equipped with a stirrer, a cooling tube, a nitrogen introducing tube, and a thermometer, 324.4 g of o-cresol, 332.4 g of 1,4-bis(1-hydroxyethyl)benzene, and 19.0 g of p-toluenesulfonic acid monohydrate were charged, the temperature of the mixture was raised to 150° C. while being stirred, and it was reacted for 5 hours. During this process, water produced by the reaction was excluded to the outside of the system. The temperature was then lowered to 120° C., and 260.4 g of styrene was added dropwise thereto over 5 hours to be reacted to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,200).

Example 4

Synthesis was carried out by the same method as in Example 3 except that 260.4 g of styrene in Example 3 was changed to 295.5 g of α-methylstyrene to obtain a curable resin (Mw: 2,000).

Example 5

Synthesis was carried out by the same method as in Example 3 except that 260.4 g of styrene in Example 3 was changed to 295.5 g of 4-methylstyrene to obtain a curable resin (Mw: 1,900).

Example 6

Synthesis was carried out by the same method as in Example 3 except that 260.4 g of styrene in Example 3 was changed to 450.8 g of 1,1-diphenylethylene to obtain a curable resin (Mw: 1,900).

Example 7

Synthesis was carried out by the same method as in Example 3 except that 260.4 g of styrene in Example 3 was changed to 280.6 g of 1-octene to obtain a curable resin (Mw: 1,800).

Example 8

Synthesis was carried out by the same method as in Example 3 except that 324.4 g of o-cresol in Example 3 was changed to 366.5 g of 2-ethylphenol to obtain a curable resin (Mw: 1,800).

Example 9

Synthesis was carried out by the same method as in Example 3 except that 324.4 g of o-cresol in Example 3 was changed to 510.6 g of 2-phenylphenol to obtain a curable resin (Mw: 1,800).

Example 10

Synthesis was carried out by the same method as in Example 3 except that 324.4 g of o-cresol in Example 3 was changed to 528.8 g of 2-cyclohexylphenol to obtain a curable resin (Mw: 1,900).

Example 11

Synthesis was carried out by the same method as in Example 3 except that 324.4 g of o-cresol in Example 3 was changed to 324.4 g of p-cresol to obtain a curable resin (Mw: 2,600).

Example 12

Synthesis was carried out by the same method as in Example 3 except that 9.2 g of 4-chloromethylstyrene in Example 3 was changed to 9.3 g of methacrylic anhydride and 7.0 g of the 48% aqueous potassium hydroxide solution was changed to 0.2 g of 4-dimethylaminopyridine to obtain a curable resin (Mw: 2,200).

Example 13

Into a 3 L, four-necked separable flask equipped with a stirrer, a cooling tube, a nitrogen introducing tube, and a thermometer, 324.4 g of o-cresol and 19.0 g of p-toluenesulfonic acid monohydrate were charged, the temperature of the mixture was raised to 120° C. while being stirred, and 280.4 g of divinylbenzene was added dropwise thereto over 5 hours to be reacted. Subsequently, 260.4 g of styrene was added dropwise thereto over 5 hours to be reacted to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,100).

Example 14

Synthesis was carried out by the same method as in Example 3 except that 324.4 g of o-cresol in Example 3 was changed to 366.49 g of 2,5-xylenol to obtain a curable resin (Mw: 2,300).

Example 15

Synthesis was carried out by the same method as in Example 3 except that 324.4 g of o-cresol in Example 3 was changed to 408.54 g of 2,3,5-trimethylphenol to obtain a curable resin (Mw: 2,500).

Example 16

Synthesis was carried out by the same method as in Example 3 except that 9.2 g of 4-chloromethylstyrene in Example 3 was changed to 7.3 g of acrylic bromide and 7.0 g of the 48% aqueous potassium hydroxide solution was changed to 20.0 g of potassium carbonate to obtain a curable resin (Mw: 1,800).

Comparative Example 1

Into a 3 L, four-necked separable flask equipped with a stirrer, a cooling tube, a nitrogen introducing tube, and a thermometer, 282.3 g of phenol, 276.3 g of p-xylylene glycol, and 19.0 g of p-toluenesulfonic acid monohydrate were charged, the temperature of the mixture was raised to 150° C. while being stirred, and it was reacted for 5 hours. During this process, methanol produced by the reaction was excluded to the outside of the system to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,300).

Comparative Example 2

Into a 3 L, four-necked separable flask equipped with a stirrer, a cooling tube, a nitrogen introducing tube, and a thermometer, 324.4 g of o-cresol, 276.3 g of p-xylylene glycol, and 19.0 g of p-toluenesulfonic acid monohydrate were charged, the temperature of the mixture was raised to 150° C. while being stirred, and it was reacted for 5 hours. During this process, methanol produced by the reaction was excluded to the outside of the system to obtain an intermediate phenolic compound.

Into a 100 mL, four-necked flask equipped with a stirrer, a cooling tube, a nitrogen introducing tube, and a thermometer, 10.0 g of the intermediate phenolic compound synthesized above, 10.0 g of N,N-dimethylformamide, 9.2 g of 4-chloromethylstyrene, and 7.0 g of a 48% aqueous potassium hydroxide solution were charged, the temperature of the mixture was raised to 60° C. while being stirred, and it was reacted for 20 hours. The reaction solution was poured into 100 g of methanol to reprecipitate a polymer. The polymer was redissolved in 100 g of tetrahydrofuran and was again poured into 100 g of methanol to reprecipitate a polymer. The obtained polymer was washed twice with 100 g of methanol. The polymer was then dried at 50° C. for 2 hours under reduced pressure to obtain a curable resin (Mw: 2,400).

<Production of Resin Film (Cured Product)>

Each of the curable resins (solid powders) obtained in the examples and the comparative examples was put into a square mold frame 5 cm square, was held between stainless plates, and was set in a vacuum press. It was pressurized up to 1.5 MPa under normal pressure and temperature. Next, the pressure was reduced to 10 torr and was then heated up to a temperature 50° C. above a thermosetting temperature over 30 minutes. Furthermore, the product was left at rest for 2 hours and was then slowly cooled to room temperature. Thus, a uniform resin film (a cured product) with an average film thickness of 100 μm was produced.

In Example 16 (X is an allyl ether group), the homopolymerization (cross-linking) of the curable resin alone does not proceed, and thus only production confirmation of the curable resin was made, and evaluation based on the resin film (the cured product) below was not performed.

<Evaluation of Dielectric Properties>

As to the dielectric properties of the obtained resin film (cured product) in the in-plane direction, a dielectric constant and a dielectric loss tangent were measured at a frequency of 10 GHz by the split-post dielectric resonator method using a network analyzer N5247A of Keysight Technologies. As to the dielectric loss tangent, if it is $10\times10^{-3}$ or less, there is no problem in practical use, and it is preferably $5.5\times10^{-3}$ or less and more preferably $4.5\times10^{-3}$ or less. As to the dielectric constant, if it is 3 or less, there is no problem in practical use, and it is preferably 2.8 or less and more preferably 2.6 or less.

<Evaluation of Heat Resistance (Glass Transition Temperature)>

For the obtained resin film (cured product), using a DSC apparatus (Pyris Diamond) manufactured by Perkin Elmer, a peak exothermic temperature (a thermosetting temperature) observed when measured at a temperature increase condition of 20° C./minute from room temperature was observed, and then it was held at a temperature 50° C. above it for 30 minutes. Next, the sample was cooled to room temperature at a temperature decrease condition of 20° C./minute, and furthermore, the temperature was again increased at a temperature increase condition of 20° C./minute to measure the glass transition temperature (Tg) (° C.) of the resin film (the cured product). As to the glass transition temperature (Tg), if it is 100° C. or higher, there is no problem in practical use, and it is preferably 130° C. or higher and more preferably 150° C. or higher.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| $R_1$ | $CH_3$ | $CH_3$ | $CH_3$ | $CH_3$ | $CH_3$ | $CH_3$ | $CH_3$ | $CH_2CH_3$ | Ph | Cy |
| $R_2$ | H | $CH_3$ | $CH_3$ | $CH_3$ | $CH_3$ | $CH_3$ | $CH_3$ | $CH_3$ | $CH_3$ | $CH_3$ |
| | H | $CH_3$ | H | H | H | H | H | H | H | H |
| $R_3$ | Ph | Ph | Ph | Ph | Ph—$CH_3$ | Ph | $(CH_2)_5CH_3$ | Ph | Ph | Ph |
| | H | H | H | $CH_3$ | H | Ph | H | H | H | H |
| X | Vinyl-benzyl ether group | Vinyl-benzyl ether group | Vinyl-benzyl ether group | Vinyl-benzyl ether group | Vinyl-benzyl ether group | Vinyl-benzyl ether group | Vinyl-benzyl ether group | Vinyl-benzyl ether group | Vinyl-benzyl ether group | Vinyl-benzyl ether group |
| Dielectric loss tangent ($\times10^{-3}$) | 3.7 | 3.7 | 3.2 | 3.1 | 2.9 | 2.8 | 3.5 | 2.8 | 2.9 | 2.9 |

TABLE 1-continued

| | Examples | | | | | | | | | |
|---|---|---|---|---|---|---|---|---|---|---|
| | 1 | 2 | 3 | 4 | 5 | 6 | 7 | 8 | 9 | 10 |
| Dielectric constant | 2.7 | 2.7 | 2.5 | 2.5 | 2.4 | 2.4 | 2.4 | 2.3 | 2.3 | 2.2 |
| Tg (° C.) | 130 | 158 | 160 | 161 | 161 | 178 | 158 | 166 | 180 | 178 |

Note:
$R_1$ in Table 1 above, Examples 1 to 10, 12, and 13 have a methyl group or the like at the ortho position with respect to the cross-linking group X. Example 11 has a methyl group at the ortho position with respect to the cross-linking group X. Example 14 has methyl groups at the ortho (2-) and meta (5-) positions with respect to the cross-linking group X. Example 15 has methyl groups at the ortho (2-), meta (3-), and meta (5-) positions with respect to the cross-linking group X.

TABLE 2

| | Examples | | | | | Comparative Examples | |
|---|---|---|---|---|---|---|---|
| | 11 | 12 | 13 | 14 | 15 | 1 | 2 |
| $R_1$ | $CH_3$ at para position | $CH_3$ | $CH_3$ | $CH_3$<br>$CH_3$<br>— | $CH_3$<br>$CH_3$<br>$CH_3$ | — | $CH_3$ |
| $R_2$ | $CH_3$<br>H | $CH_3$<br>H | $CH_3$<br>H | $CH_3$<br>H | $CH_3$<br>H | H<br>H | H<br>H |
| $R_3$ | Ph<br>H | Ph<br>H | Ph<br>H | Ph<br>H | Ph<br>H | —<br>— | —<br>— |
| X | Vinylbenzyl ether group | Methacryloyloxy group | Vinylbenzyl ether group | Vinylbenzyl ether group | Vinylbenzyl ether group | Vinylbenzyl ether group | Vinylbenzyl ether group |
| Dielectric loss tangent ($\times 10^{-3}$) | 3.5 | 2.3 | 3.2 | 3.1 | 3 | 6.7 | 6 |
| Dielectric constant | 2.5 | 2.4 | 2.5 | 2.5 | 2.5 | 2.9 | 2.9 |
| Tg (° C.) | 171 | 161 | 160 | 162 | 162 | 121 | 127 |

Note:
Ph and Cy in Table 1 and Table 2 above represent a phenyl group and a cyclohexyl group, respectively.

From the evaluation results in Table 1 and Table 2 above, it was confirmed that in all the examples the cured products obtained by using the curable resins were able to achieve both heat resistance and low dielectric properties, which were on a level with no practical problem.

On the other hand, from the evaluation results in Table 2 above, in Comparative Example 1, it was confirmed that the high molecular mobility of the main chain and the terminal cross-linking group (a polar site) in the obtained curable resin resulted in higher values for the dielectric loss tangent and the dielectric constant and inferior dielectric properties (low dielectric properties were not obtained), and the low rigidity of the main chain resulted in a low glass transition temperature (Tg) and poor heat resistance. In Comparative Example 2, it was also confirmed that the high molecular mobility of the terminal cross-linking group (the polar site) of the curable resin resulted in higher values for the dielectric loss tangent and the dielectric constant and inferior dielectric properties, and the low rigidity of the main chain resulted in a low glass transition temperature (Tg) and poor heat resistance.

INDUSTRIAL APPLICABILITY

The cured product obtained by using the curable resin of the present invention has excellent heat resistance and dielectric properties and can thus suitably be used for heat-resistant members and electronic members. It can be particularly suitably used for prepregs, semiconductor sealing materials, circuit boards, build-up films, build-up boards, adhesives, and resist materials. It can also be suitably used for matrix resins of fiber-reinforced resins and is suitable as prepregs with high heat resistance.

What is claimed is:

1. A curable resin comprising a structural unit (1) represented by General Formula (1) below and a terminal structure (2) represented by General Formula (2) below:

(1)

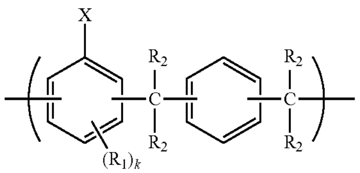

(2)

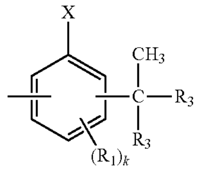

in General Formulae (1) and (2) above, $R_1$s each independently represent an alkyl group with a carbon number of 1 to 12, an aryl group, an aralkyl group, or a cycloalkyl group; k indicates an integer of 1 to 3;

$R_2$s each independently represent a hydrogen atom or a methyl group; X represents a vinylbenzyl ether group; and in General Formula (2) above, $R_3$s each independently represent a hydrogen atom, an alkyl group with a carbon number of 1 to 12, an aryl group, an aralkyl group, a cycloalkyl group, or an alkenyl group.

2. The curable resin according to claim 1, wherein General Formula (1) above is represented by General Formula (1-1) below:

(1-1)

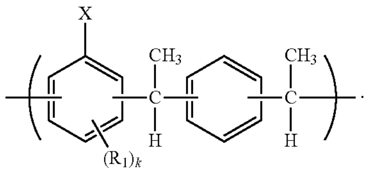

3. The curable resin according to claim 1, wherein General Formula (2) above is represented by General Formula (2-1) below:

(2-1)

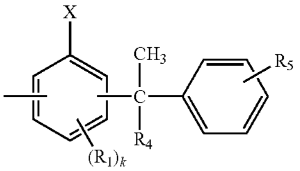

in General Formula (2-1) above, $R_4$ represents a hydrogen atom, a methyl group, or a phenyl group; and $R_5$ represents an alkyl group with a carbon number 1 to 4.

4. The curable resin according to claim 1, wherein

General Formula (1) above is represented by General Formula (1-2) below, and

General Formula (2) above is represented by General Formula (2-2) or (2-3) below, (1-2)

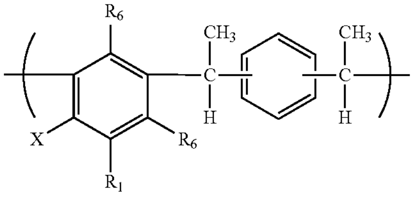

(2-2)

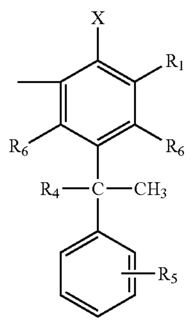

-continued (2-3)

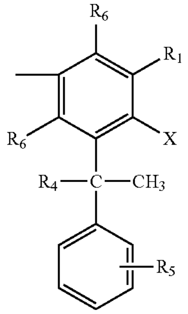

in General Formulae (1-2), (2-2), and (2-3) above, $R_4$ represents a hydrogen atom, a methyl group, or a phenyl group; $R_5$ represents an alkyl group with a carbon number 1 to 4; and $R_6$s each independently represent a hydrogen atom, an alkyl group with a carbon number of 1 to 12, an aryl group, an aralkyl group, or a cycloalkyl group.

5. The curable resin according to claim 1, wherein the curable resin has a weight average molecular weight of 500 to 50,000.

6. A curable resin composition comprising the curable resin according to claim 1.

7. A cured product obtained by subjecting the curable resin composition according to claim 6 to a curing reaction.

8. The curable resin according to claim 2, wherein General Formula (2) above is represented by General Formula (2-1) below:

(2-1)

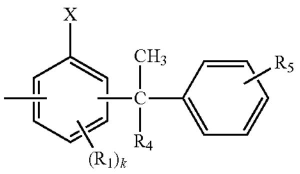

in General Formula (2-1) above, $R_4$ represents a hydrogen atom, a methyl group, or a phenyl group; and $R_5$ represents an alkyl group with a carbon number 1 to 4.

9. A curable resin composition comprising the curable resin according to claim 2.

10. A curable resin composition comprising the curable resin according to claim 3.

11. A curable resin composition comprising the curable resin according to claim 4.

12. A curable resin composition comprising the curable resin according to claim 8.

13. A cured product obtained by subjecting the curable resin composition according to claim 9 to a curing reaction.

14. A cured product obtained by subjecting the curable resin composition according to claim 10 to a curing reaction.

15. A cured product obtained by subjecting the curable resin composition according to claim 11 to a curing reaction.

16. A cured product obtained by subjecting the curable resin composition according to claim 12 to a curing reaction.

* * * * *